US012586168B2

(12) United States Patent
Chen

(10) Patent No.: US 12,586,168 B2
(45) Date of Patent: Mar. 24, 2026

(54) IMAGE ENHANCEMENT METHOD USING STATISTICAL INDEX-BASED TONE MAPPING CURVE SELECTION AND ELECTRONIC DEVICE USING THE SAME

(71) Applicant: Cupola360 INC., Hsinchu City (TW)

(72) Inventor: Hsin-Hui Chen, Hsinchu (TW)

(73) Assignee: Cupola360 INC., Hsinchu City (TW)

( * ) Notice: Subject to any disclaimer, the term of this patent is extended or adjusted under 35 U.S.C. 154(b) by 253 days.

(21) Appl. No.: 18/342,716

(22) Filed: Jun. 27, 2023

(65) Prior Publication Data

US 2024/0362759 A1 Oct. 31, 2024

(30) Foreign Application Priority Data

Apr. 28, 2023 (TW) .................................. 112115960

(51) Int. Cl.
*G06T 5/92* (2024.01)

(52) U.S. Cl.
CPC ...... *G06T 5/92* (2024.01); *G06T 2207/20021* (2013.01)

(58) Field of Classification Search
CPC ............. G06T 5/92; G06T 2207/20021; G06T 2207/20076; G06T 5/40
USPC ........................................................ 382/274
See application file for complete search history.

(56) References Cited

U.S. PATENT DOCUMENTS 8,295,596 B1 10/2012 Srinivasan et al.
2011/0243473 A1* 10/2011 Chen .................... G09G 3/2011
382/274

2020/0219238 A1* 7/2020 Peng ......................... H04N 9/68
2022/0164931 A1* 5/2022 Atkins ................. H04N 1/6077
2022/0237755 A1 7/2022 Yang
2023/0033975 A1* 2/2023 Lin ............................ G06T 5/20

(Continued)

FOREIGN PATENT DOCUMENTS

CN 105608676 6/2018
CN 108280836 7/2018
CN 110599415 12/2019

(Continued)

OTHER PUBLICATIONS

An Adaptive Global and Local Tone Mapping Algorithm Implemented on FPGA, by Ambalathankandy et al., IEEE Transactions on Circuits and Systems for Video Technology (vol. 30, Issue: 9, 2020, pp. 3015-3028) Sep. 1, 2020 (Year: 2020).*

(Continued)

*Primary Examiner* — Jennifer Mehmood
*Assistant Examiner* — Heath E. Wells
(74) *Attorney, Agent, or Firm* — JCIPRNET

(57) ABSTRACT

An image enhancement method and an electronic device are disclosed. The image enhancement method includes the following steps. An original image is divided into multiple image blocks. A statistical data of each of the image blocks is calculated, and at least one index is obtained according to the statistical data of the each of the image blocks. A final tone mapping curve of the each of the image blocks is obtained based on multiple predefined tone mapping curves according to the at least one index of the each of the image blocks. Afterwards, the original image is adjusted according to the final tone mapping curve of the each of the image blocks to obtain an enhanced image.

16 Claims, 6 Drawing Sheets

(56)            References Cited

U.S. PATENT DOCUMENTS

2024/0354915  A1*  10/2024  Kim .......................... G06T 5/50

FOREIGN PATENT DOCUMENTS

| CN | 112053309 | 12/2020 |
|----|-----------|---------|
| CN | 110580690 | 5/2021 |
| CN | 115578284 | 1/2023 |
| TW | 201530494 | 8/2015 |
| TW | I727306 | 5/2021 |

OTHER PUBLICATIONS

Karel Zuiderveld, "Contrast Limited Adaptive Histogram Equalization", Graphics gems IV. San Diego: Academic Press Professional, 1994, pp. 474-485.
"Office Action of Taiwan Counterpart Application", issued on Oct. 30, 2023, p. 1-p. 18.

* cited by examiner

110 — memory circuit processing circuit — 120

100 electronic device

IMAGE ENHANCEMENT METHOD USING STATISTICAL INDEX-BASED TONE MAPPING CURVE SELECTION AND ELECTRONIC DEVICE USING THE SAME

CROSS-REFERENCE TO RELATED APPLICATION

This application claims the priority benefit of Taiwan application serial no. 112115960, filed on Apr. 28, 2023. The entirety of the above-mentioned patent application is hereby incorporated by reference herein and made a part of this specification.

BACKGROUND

Technical Field

This disclosure related to an image processing technique, in particular to an image enhancement method and an electronic device.

Description of Related Art

With the advancement of technology, video analytics applications are becoming popular, such as video surveillance, face recognition, license plate recognition, and target tracking. These video analytics applications require high image quality to ensure application accuracy and ease of observation by the human eye. Therefore, for video analysis applications, image enhancement processing to improve image quality is very important. Image enhancement processing can be used to improve the brightness, contrast, and sharpness of the image, etc., to effectively improve the image quality.

Currently, the conventional contrast limited adaptive histogram equalization (CLAHE) is an image processing technique that can improve image contrast and has been widely used in many fields. The contrast limited adaptive histogram equalization requires manual adjustment of the histogram clipping value to control the slope of the mapping function obtained from the accumulation of local histograms, which determines the magnitude of image contrast enhancement. However, although the contrast limited adaptive histogram equalization can significantly improve the image contrast, it is also prone to excessive amplified image noise or artifacts, and the contrast enhancement magnitude is limited by the histogram clipping value. Furthermore, if the histogram clipping value is adjusted based on the need to improve the image contrast, it will tend to excessively amplify the image noise. If the histogram clipping value is adjusted based on the need to avoid amplifying the image noise, the contrast enhancement amplify will be reduced.

SUMMARY

The disclosure provides an image enhancement method and an electronic device, capable of producing an enhanced image with high contrast and low noise.

Embodiments of the disclosure proposes an image enhancement method including the following steps. An original image is divided into multiple image blocks. A statistical data of each of the image blocks is calculated, and at least one index is obtained according to the statistical data of the each of the image blocks. A final tone mapping curve of the each of the image blocks is obtained based on multiple predefined tone mapping curves according to the at least one index of the each of the image blocks. Afterwards, the original image is adjusted according to the final tone mapping curve of the each of the image blocks to obtain an enhanced image.

Embodiments of the disclosure proposes an electronic device including a memory circuit and a processing circuit. The processing circuit is coupled to the memory circuit and performs the following steps. An original image is divided into multiple image blocks. A statistical data of each of the image blocks is calculated, and at least one index is obtained according to the statistical data of the each of the image blocks. A final tone mapping curve of the each of the image blocks is obtained based on multiple predefined tone mapping curves according to the at least one index of the each of the image blocks. Afterwards, the original image is adjusted according to the final tone mapping curve of the each of the image blocks to obtain an enhanced image.

Based on the above, the image enhancement method and the electronic device of the disclosure may determine an index according to the statistical data of multiple pixels in the each of the image blocks, and obtain the final tone mapping curve according to the index and multiple predefined tone mapping curves. Thus, the original image may be transformed into a high-contrast enhanced image based on the final tone mapping curve corresponding to the each of the image blocks. As a result, excessive noise amplification may be avoided while enhancing image contrast, and computing resources may be effectively reduced.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Some embodiments of the disclosure will be described in detail with the accompanying drawings, and the numeral references cited in the following description will be regarded as the same or similar when the same numeral references appear in different drawings. The embodiments are only a part of the disclosure and do not reveal all the ways in which the disclosure can be implemented. More precisely, the embodiments are only examples of a method and a device of the claims of the disclosure.

Figure 1:
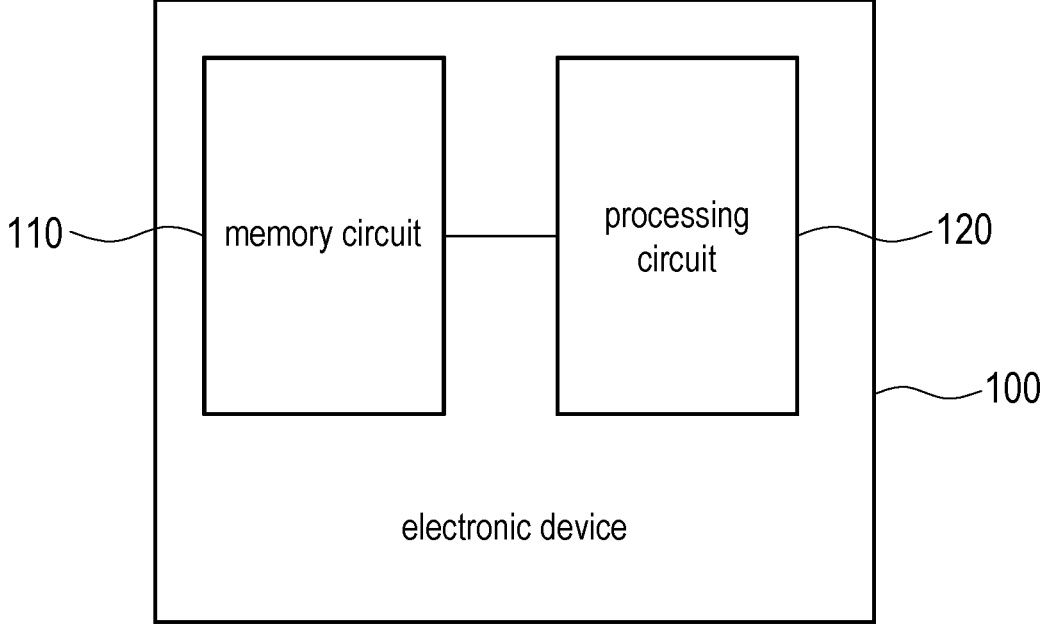
FIG. 1 is a schematic diagram of an electronic device according to an embodiment of the disclosure.

FIG. 1 is a schematic diagram of an electronic device according to an embodiment of the disclosure Referring to FIG. 1, an electronic device 100 may include a memory circuit 110 and a processing circuit 120, and the processing circuit 120 is coupled to the memory circuit 110.

The memory circuit 110 is, for example, any type of fixed or removable random access memory (RAM), read-only memory (ROM), flash memory, hard disk, or other similar devices or a combination of these devices that may be used to record images, data, instructions, program codes, or software/firmware modules, etc. The software/firmware modules may be broadly construed to mean instructions, instruction sets, codes, program codes, programs, applications, software packages, execution threads, processes, functions, etc., regardless of whether they are referred to as software, firmware, middleware, microcode, hardware description language, or others.

The processing circuit 120 is, for example, a central processing unit (CPU), an application processor (AP), or other programmable general purpose or special purpose microprocessor, digital signal processor (DSP), image signal processor (ISP), graphics processing unit (GPU), programmable controller, field programmable gate array (FPGA), application-specific integrated circuit (ASIC), or other similar devices, integrated circuits, or combinations thereof.

In some embodiments, the processing circuit 120 may load and execute instructions, program codes, and software/firmware modules recorded in the memory 110 to implement the relevant functions of the processing circuit 120 of the embodiment of the disclosure. In some embodiments, the relevant functions of the processing circuit 120 may be implemented as a hardware circuit including multiple logic gates by using a hardware description language or other suitable programming languages. In other words, the embodiments of the disclosure may be implemented using hardware, software, firmware, or a combination thereof.

In the following, the method described in the embodiment of the disclosure will be illustrated with each device, component, and/or module of the electronic device 100. The various processes of the method may be adapted according to the circumstances of implementation and are not limited thereto.

Figure 2:
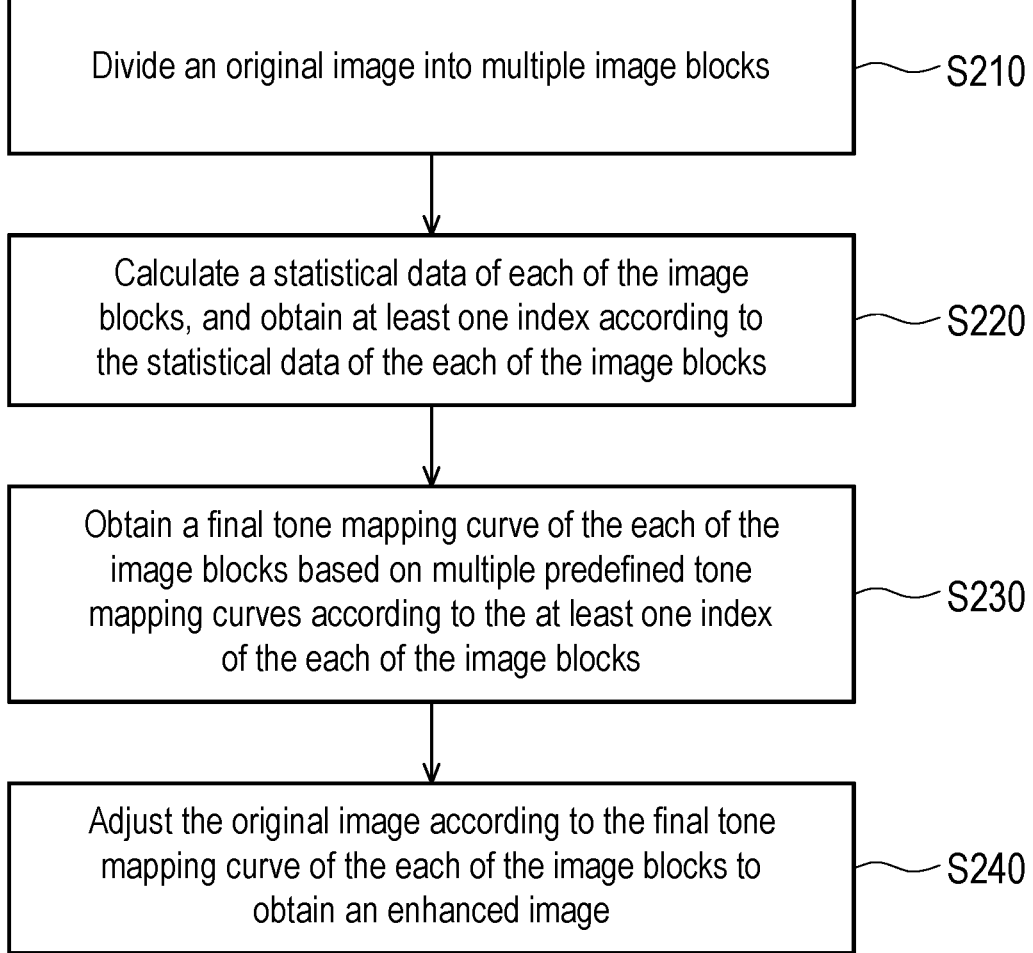
FIG. 2 is a flowchart of an image enhancement method according to an embodiment of the disclosure.

FIG. 2 is a flowchart of an image enhancement method according to an embodiment of the disclosure. Referring to FIG. 2, in step S210, the processing circuit 120 divides an original image into multiple image blocks. In some embodiments, the processing circuit 120 may obtain the original image from a camera or a video monitor including an image sensor. In some embodiments, the processing circuit 120 may read the original image from the memory circuit 110. In some embodiments, the original image may be a video frame in a video stream. The processing circuit 120 may divide the original image into P*Q image blocks, in which P and Q are integers greater than 1, and the image blocks do not overlap with each other.

In step S220, the processing circuit 120 calculates a statistical data of each of the image blocks, and obtains at least one index according to the statistical data of the each of the image blocks. In some embodiments, the processing circuit 120 may respectively perform statistical operations on pixel values of multiple pixels in the each of the image blocks to obtain the statistical data of the each of the image blocks. For example, assuming that the each of the image blocks includes m*n pixels, in which m and n are integers greater than 1, the processing circuit 120 may perform statistical operations on m*n pixel values in the each of the image blocks. In some embodiments, the pixel value may be a brightness value, such as a Y component in a YUV space. In some embodiments, the statistical operations include mean operations, variance operations, other types of statistical operations, or combinations thereof.

In some embodiments, the processing circuit 120 may input the statistical data of the each of the image blocks to a transition function to obtain at least one index corresponding to the each of the image blocks. For example, the processing circuit 120 may input a brightness mean value of a certain image block into the transition function to obtain a brightness index used to determine a final tone mapping curve of the image block. The transition function may be implemented as lookup tables, mathematical functions, or specific bit capturing operations, etc.

In step S230, the processing circuit 120 obtains the final tone mapping curve of the each of the image blocks based on multiple predefined tone mapping curves according to the at least one index of the each of the image blocks. For example, the memory circuit 110 may record the predefined tone mapping curves, and the predefined tone mapping curves may be used to map an input pixel value to an output pixel value, such as mapping input brightness to output brightness. The predefined tone mapping curves correspond to one or more default indexes respectively. In some embodiments, the processing circuit 120 may select the final tone mapping curve from the predefined tone mapping curves by comparing the index corresponding to the each of the image blocks with the default indexes of the predefined tone mapping curves. Alternatively, in some embodiments, the processing circuit 120 may select two of the predefined tone mapping curves to perform an interpolation operation to generate the final tone mapping curve by comparing the index corresponding to the each of the image blocks with the default indexes of the predefined tone mapping curves. In other words, the final tone mapping curve may be one of the predefined tone mapping curves, or a result of the interpolation operation of a portion of the predefined tone mapping curves.

In step S240, the processing circuit 120 adjusts the original image according to the final tone mapping curve of the each of the image blocks to obtain an enhanced image. Specifically, the processing circuit 120 may convert a brightness value of one or more pixels in the each of the image blocks according to the respective final tone mapping curves of the each of the image blocks to obtain a portion of enhanced pixels. Afterwards, the processing circuit 120 may determine the brightness value of the remaining enhanced pixels through a linear interpolation operation. Accordingly, the processing circuit 120 may obtain the enhanced image consisting of the enhanced pixels.

It can be seen that, in this embodiment, by recording the predefined tone mapping curves in the memory circuit 110 and obtaining the final tone mapping curve of the each of the image blocks according to the index, the processing circuit 120 does not need to spend a large amount of computing resources to calculate the transition function for converting the pixel values for the multiple image blocks. Thus, the image enhancement method according to the embodiment of the disclosure is more suitable for implementation on hardware with limited computing resources than the conventional contrast limited adaptive histogram equalization.

It should also be noted that, in other embodiments, the processing circuit 120 converts a high dynamic range image to a low dynamic range image according to similar operations as shown in FIG. 2. However, the predefined tone mapping curves are used to convert the brightness value of high-bit-number to the brightness value of low-bit-number.

To further illustrate how the disclosure uses the index based on statistical data to obtain the final tone mapping curve of the each of the image blocks, another embodiment is set forth below to illustrate in detail.

Figure 3:
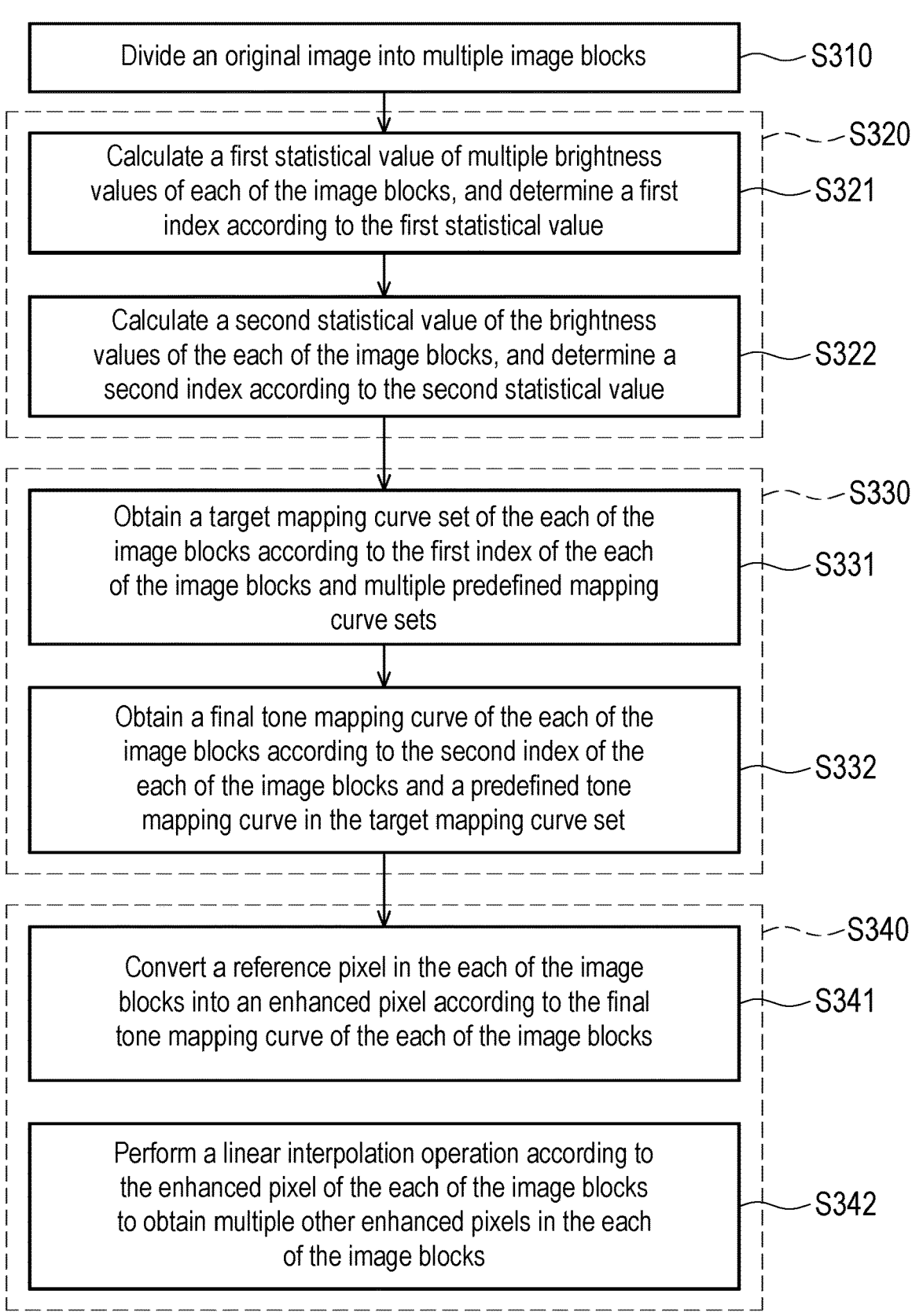
FIG. 3 is a flowchart of an image enhancement method according to an embodiment of the disclosure.

FIG. 3 is a flowchart of an image enhancement method according to an embodiment of the disclosure. Referring to FIG. 3, in step S310, the processing circuit 120 divides the original image into multiple image blocks.

In step S320, the processing circuit 120 calculates the statistical data of the each of the image blocks, and obtains the at least one index according to the statistical data of the each of the image blocks. In this embodiment, step S320 may be implemented as step S321 to step S322.

In step S321, the processing circuit 120 calculates a first statistical value of multiple brightness values of the each of the image blocks, and determines a first index according to the first statistical value. In one embodiment, the first statistical value of the each of the image blocks may include a brightness variance value. In other words, the first statistical value is, for example, the brightness variance value of the brightness values in the each of the image blocks. Next, the processing circuit 120 may determine the first index of the each of the image blocks according to the brightness variance value of the each of the image blocks. Thus, the first index may also be called a brightness variance index.

In step S322, the processing circuit 120 calculates a second statistical value of the brightness values of the each of the image blocks, and determines a second index according to the second statistical value. In one embodiment, the second statistical value of the each of the image block includes a brightness mean value. In other words, the second statistical value is, for example, the brightness mean value of the brightness values in the each of the image blocks. Next, the processing circuit 120 may determine the second index of the each of the image blocks according to the brightness mean value of the each of the image blocks. Thus, the second index may also be called a brightness mean index.

In one embodiment, the processing circuit 120 may determine the first index by taking multiple most significant bits of the first statistical value, in which an integer part of the first index is the most significant bits. For example, assuming that a value range of the first statistical value is 0 to 255, the first statistical value may have 8 bits. The processing circuit 120 may retain three most significant bits of the first statistical value to generate the first index.

In one embodiment, the processing circuit 120 may determine the first index by taking multiple most significant bits of the first statistical value, and may determine the first index by taking multiple least significant bits of the first statistical value, in which an integer part of the first index is the most significant bits, and a decimal part of the first index is the least significant bits. For example, assuming that a value range of the first statistical value is 0 to 255, the first statistical value may have 8 bits. The processing circuit 120 may retain three most significant bits of the first statistical value to generate the integer part of the first index, and take five least significant bits of the first statistical value to generate the decimal part of the first index.

In one embodiment, the processing circuit 120 may obtain the first index by searching a lookup table according to the first statistical value. For example, assuming that the value range of the first statistical value is 0 to 255, the first statistical value may have 8 bits. The processing circuit 120 may obtain a 3-bit first index by looking up the table according to the 8-bit first statistical value.

In some embodiments, the first index is positively correlated with the first statistical value. That is, a first index value may increase as the first statistical value rises.

In addition, the above embodiments are described in terms of the first statistical value. However, the processing circuit 120 may determine the second index according to the second statistical value according to similar operations. It should be noted that, in different embodiments, the processing circuit 120 may generate the first index and the second index according to the same or different conversion operations.

In step S330, the processing circuit 120 obtains a final tone mapping curve of the each of the image blocks based on multiple predefined tone mapping curves according to at least one index of the each of the image blocks. In this embodiment, step S330 may be implemented as step S331 to step S332.

In step S331, the processing circuit 120 obtains a target mapping curve set of the each of the image blocks according to the first index of the each of the image blocks and multiple predefined mapping curve sets. In step S332, the processing circuit 120 obtains the final tone mapping curve of the each of the image blocks according to the second index of the each of the image blocks and the predefined tone mapping curve in the target mapping curve set.

In detail, in this embodiment, the memory circuit 110 may record multiple predefined mapping curve sets. Each of the predefined mapping curve sets may include multiple predefined tone mapping curves. It should be noted that a number of the predefined mapping curve sets, a number and shape of the predefined tone mapping curves in the each of the predefined mapping curve sets may be defined according to actual needs.

In addition, the predefined mapping curve sets correspond to different default set indexes respectively, and the predefined tone mapping curves in the each of the predefined mapping curve sets respectively correspond to different default curve indexes. That is, a number of the default set indexes may be equal to a number of the predefined mapping curve sets, and a number of the default curve indexes may be equal to a number of multiple predefined tone mapping curves in one predefined mapping curve set.

It should be noted that a value range of the default set index and a value range of the default curve index are related to a generation method of the first index and the second index. Assuming that the first index and the second index are 4-bit values respectively, the default set index and the default curve index may fall between 0 and 15. Assuming that first index and the second index are 3-bit values respectively, the default set index and default curve index may fall between 0 and 7.

In some embodiments, in response to the first index being one of the default set indexes corresponding to the predefined mapping curve sets, the processing circuit 120 may select the target mapping curve set from the predefined mapping curve sets according to first index. On the other hand, in response to the first index not being one of the default index default set indexes corresponding to the predefined mapping curve sets, the processing circuit 120 may select two of the predefined mapping curve sets according to the first index, and generate the target mapping curve set according to the two of the predefined mapping curve sets.

Specifically, in this embodiment, taking processing of an image block as an example, the processing circuit 120 may compare the first index with multiple default set indexes to find a default set index identical to the first index from the default set indexes, and determine a predefined mapping curve set corresponding to the default set index identical to the first index as the target mapping curve set. Alternatively, the processing circuit 120 may compare the first index with multiple default set indexes to find two default set indexes closest to the first index from the default set indexes, and generate the target mapping curve set according to two predefined mapping curve sets corresponding to the two default set indexes closest to the first index.

In addition, in some embodiments, in response to the second index being one of the default curve indexes corresponding to the predefined tone mapping curves, the processing circuit 120 may select the final tone mapping curve from the predefined tone mapping curves in the target mapping curve set according to the second index. On the other hand, in response to the second index not being one of the default curve indexes corresponding to the predefined tone mapping curves, the processing circuit 120 may select two of the predefined tone mapping curves in the target mapping curve set according to the second index, and generate the final tone mapping curve according to the two of the predefined tone mapping curves in the target mapping curve set.

Figure 4:
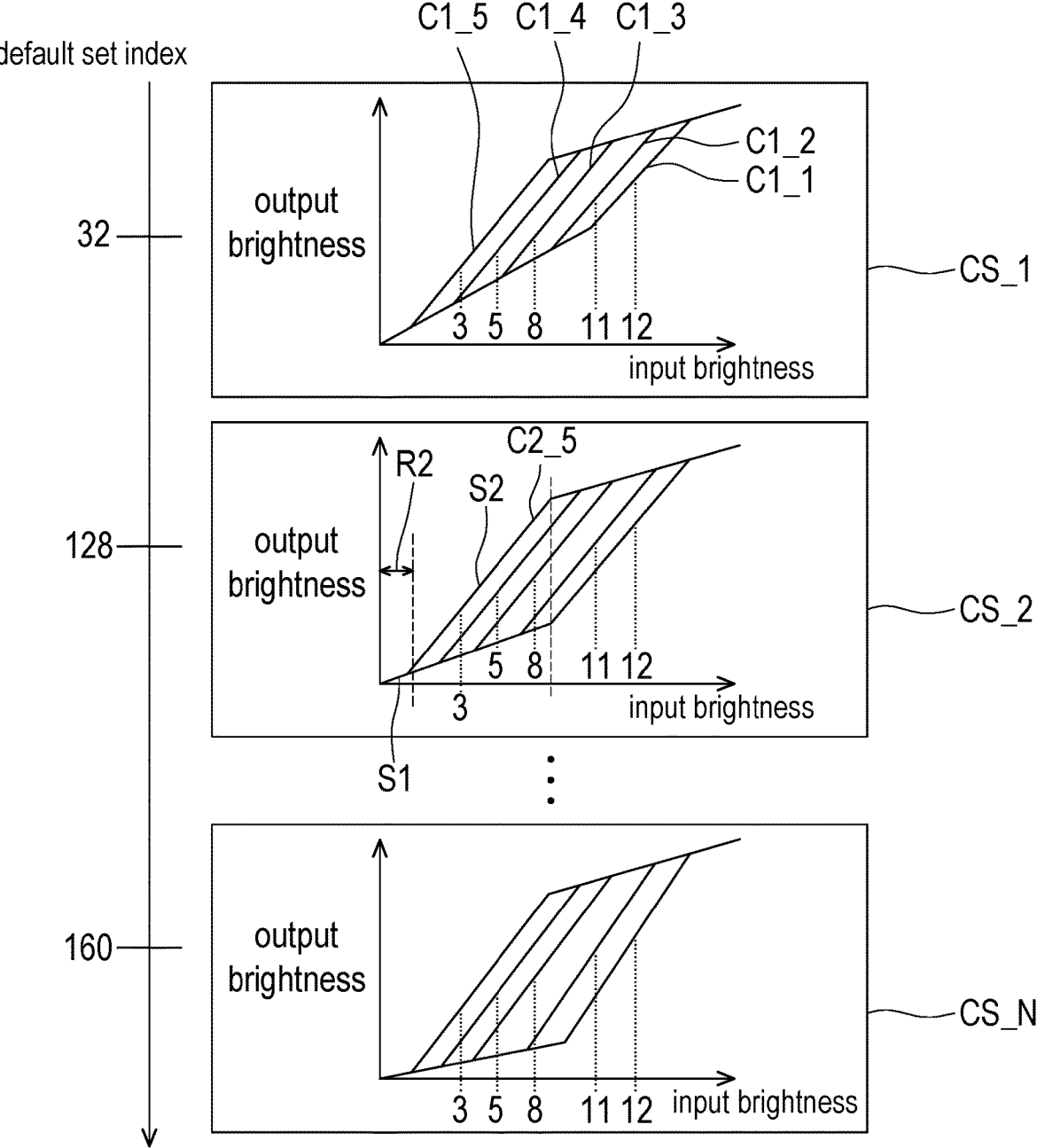
FIG. 4 is a schematic diagram of predefined mapping curve sets and predefined tone mapping curves according to an embodiment of the disclosure.

For example, FIG. 4 is a schematic diagram of predefined mapping curve sets and predefined tone mapping curves according to an embodiment of the disclosure. Referring to FIG. 4, assuming that the memory circuit 110 can record N predefined tone mapping curve sets CS_1 to CS_N, and each of the N predefined mapping curve sets CS_1 to CS_N includes five predefined tone mapping curves. For example, the predefined mapping curve set CS_1 may include five predefined tone mapping curves C1_1, C1_2, C1_3, C1_4, and C1_5. FIG. 4 shows each of the predefined tone mapping curves to convert the input brightness to the output brightness.

In addition, the predefined mapping curve set CS_1 corresponds to a default set index "32", the predefined mapping curve set CS_2 corresponds to a default set index "128", and the predefined mapping curve set CS_N corresponds to a default set index "160". It can be seen that the default set index and the first index can be 4-bit values. In addition, the predefined tone mapping curves in each of the predefined mapping curve sets CS_1 to CS_N correspond to default curve indexes "3", "5", "8", "11" and "12", respectively. For example, the predefined tone mapping curve C1_1 corresponds to the default curve index "12". It can be seen that the default curve index and second index can be 3-bit values.

Based on the example shown in FIG. 4, it is assumed that the processing circuit 120 obtains the first index of an image block as "32" and the second index as "8" according to the first statistical data and the second statistical data of the image block. Since the first index "32" is equal to the default set index "32", the predefined mapping curve set CS_1 is determined as the target mapping curve set. In this case, since the second index "8" is equal to the default curve index "8", the processing circuit 120 may obtain the final tone mapping curve of the image block as the predefined tone mapping curve C1_3 in the predefined mapping curve set CS_1.

In addition, it is assumed that the processing circuit 120 obtains the first index of the image block as "64" and the second index as "8" according to the first statistical data and the second statistical data of the image block. Since the first index "64" is not equal to any default set index, the processing circuit 120 may take the default set index "32" and the default set index "128" closest to the first index "64", and perform the interpolation operation according to the predefined mapping curve set CS_1 and the predefined mapping curve set CS_2 corresponding to the default set index "32" and the default set index "128" to obtain the target mapping curve set. In detail, the processing circuit 120 may perform the interpolation operation according to two predefined tone mapping curves corresponding to the same default curve index in the predefined mapping curve set CS_1 and the predefined mapping curve set CS_2 to generate a predefined tone mapping curve in the target mapping curve set corresponding to the default curve index. For example, the processing circuit 120 may perform the interpolation operation taking the predefined tone mapping curve C1_5 and the predefined tone mapping curve C2_5 to generate a predefined tone mapping curve in the target mapping curve set corresponding to the default curve index "3".

Figure 5:
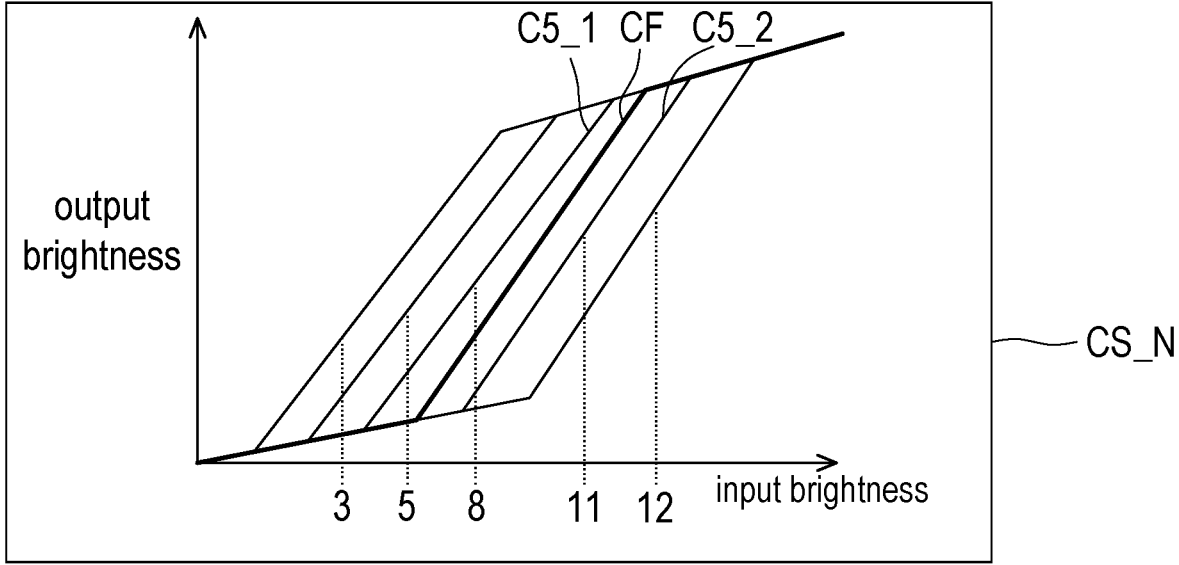
FIG. 5 is a schematic diagram of generating a final tone mapping curve according to an interpolation operation according to an embodiment of the disclosure.

In addition, it is assumed that the processing circuit 120 obtains the first index of the image block as "160" and the second index as "9.5" according to the first statistical data and the second statistical data of the image block. Since the first index "160" is equal to the default set index "160", the predefined mapping curve set CS_N is selected as the target mapping curve set. Next, referring to FIG. 5, FIG. 5 is a schematic diagram of generating a final tone mapping curve according to an interpolation operation according to an embodiment of the disclosure. Since the second index "9.5" is not equal to any default curve index, the processing circuit 120 may take the default curve index "8" and the default curve index "11" closest to the first index "9.5" to perform the interpolation operation according to two predefined tone mapping curves C5_1 and C5_2 corresponding to the default set index "8" and the default set index "11" to obtain a final tone mapping curve CF.

Furthermore, in some embodiments, each of the predefined tone mapping curves includes multiple curve segments corresponding to multiple slopes. That is, the predefined tone mapping curves may have different slopes in different brightness ranges. The curve segments of the each of the predefined tone mapping curves may include a first curve section and a second curve section, and a first slope of the first curve segment corresponding to a lowest brightness range is smaller than a second slope of the second curve segment corresponding to another brightness range. That is, the predefined tone mapping curves may have a smaller slope in the lowest brightness range, thus enhancing a low brightness image block with a smaller contrast enhancement magnitude, so as to avoid excessive enhancement of noise in the low brightness image block.

For example, as shown in FIG. 4, the predefined tone mapping curve C2_5 has a first curve segment S1 and a second curve segment S2 corresponding to different slopes. A first slope of the first curve segment S1 corresponding to a lowest brightness range R2 is smaller than a second slope of the second curve segment S2 corresponding to another brightness range. Referring to FIG. 4, other predefined tone mapping curves also have similar characteristics. In addition, the example in FIG. 4 is illustrated by the examples of the each of the predefined tone mapping curves having curve segments corresponding to three different slopes, but the disclosure is not limited thereto. In other embodiments, the each of the predefined tone mapping curves may have curve segments corresponding to more different slopes.

It should also be noted that, in some embodiments, the processing circuit 120 may determine the second index according to the brightness variance value of the image block, and determine the final tone mapping curve according to the second index. That is, the embodiment of the disclosure may determine the final tone mapping curve according to the brightness variance value of the image block. Thus, for an image block with complex image details, the embodiment of the disclosure may apply a final tone mapping curve with a relatively high contrast enhancement magnitude for image enhancement. For a flat image block, the embodiment of the disclosure may apply a final tone mapping curve with a relatively low contrast enhancement magnitude for image enhancement. In this way, an enhanced image with good quality may be produced. Compared with the conventional contrast limited adaptive histogram equalization, the image enhancement method according to the embodiment of the disclosure may enhance the local contrast of the image without excessively amplifying the noise.

In step S340, the processing circuit 120 adjusts the original image according to the final tone mapping curve of the each of the image blocks to obtain the enhanced image. In this embodiment, step S340 may be implemented as step S341 to step S342.

In step S341, the processing circuit 120 converts a reference pixel in the each of the image blocks into an enhanced pixel according to the final tone mapping curve of the each of the image blocks. The reference pixel may be a central pixel of the each of the image blocks. In step S342, the processing circuit 120 performs a linear interpolation operation according to the enhanced pixel of the each of the image blocks to obtain multiple other enhanced pixels in the each of the image blocks.

Figure 6:
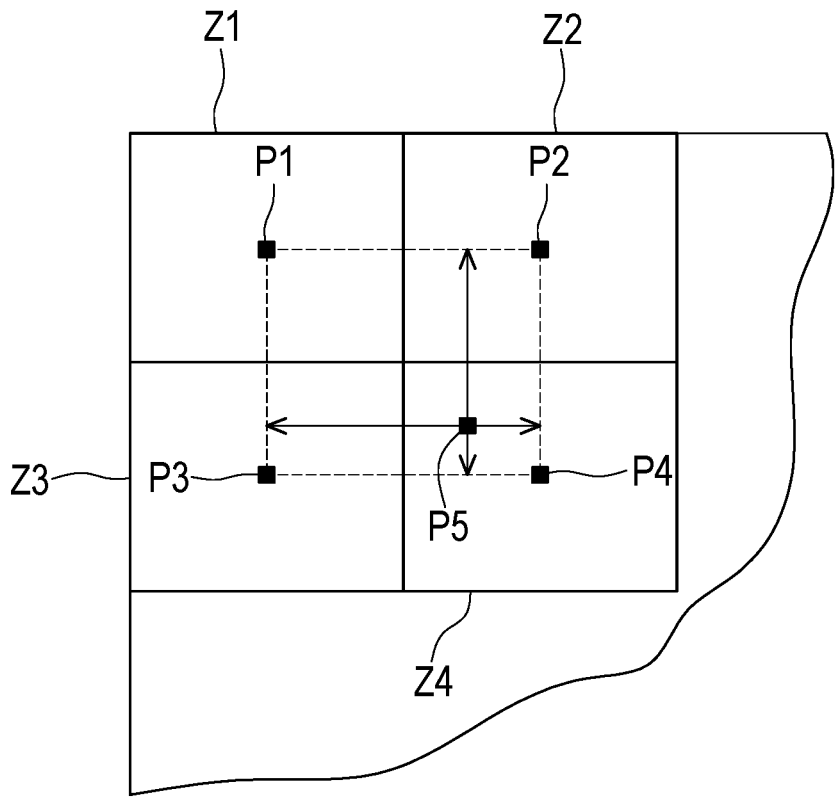
FIG. 6 is a schematic diagram of generating enhanced pixels according to an embodiment of the disclosure.

Specifically, referring to FIG. 6, FIG. 6 is a schematic diagram of generating enhanced pixels according to an embodiment of the disclosure. Based on the description of the above embodiments, the processing circuit 120 may calculate the statistical data of each of image blocks Z1 to Z4, and determine at least one index according to the statistical data of the each of the image blocks Z1 to Z4. Afterwards, the processing circuit 120 may determine a final tone mapping curve of the each of the image blocks Z1 to Z4 according to the at least one index of the each of the image blocks Z1 to Z4. Thus, the processing circuit 120 may adjust a brightness value of a central pixel P1 according to the final tone mapping curve of the image block Z1 to obtain an enhanced pixel corresponding to the central pixel P1. Similarly, the processing circuit 120 may adjust brightness values of the central pixels P2 to P4 according to the respective final tone mapping curves of the image blocks Z2 to Z4 to obtain enhanced pixels corresponding to the central pixels P2 to P4. Afterwards, the processing circuit 120 may perform a linear interpolation operation, such as a bilinear interpolation operation, according to enhanced brightness values of the enhanced pixels corresponding to the central pixels P1 to P4, so as to obtain multiple other enhanced pixels, such as the enhanced pixel corresponding to a pixel P5, in the each of the image blocks Z1 to Z4.

To sum up, the image enhancement method and the electronic device of the disclosure may determine an index according to the statistical data of multiple pixels in the each of the image blocks, and obtain the final tone mapping curve according to the index and multiple predefined tone mapping curves. Thus, the original image may be transformed into a high-contrast enhanced image based on the final tone mapping curve corresponding to the each of the image blocks. As a result, excessive noise amplification may be avoided while enhancing image contrast, and computing resources may be effectively reduced. Based on this, the image enhancement method and the electronic device of the disclosure are more suitable for implementation on hardware with limited computing resources. In addition, the image enhancement method and the electronic device of the disclosure may not only enhance the texture details in the enhanced image and improve the image contrast, but also avoid excessively amplifying the noise.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. An image enhancement method comprising:
dividing an original image into a plurality of image blocks;
calculating a brightness variance value of a plurality of brightness values of the each of the image blocks as a first statistical value, and determining a first index according to the brightness variance value;
calculating a brightness mean value of the brightness values of the each of the image blocks as a second statistical value, and determining a second index according to the brightness mean value;
obtaining a final tone mapping curve of the each of the image blocks by selecting from a plurality of predefined tone mapping curves pre-stored in a memory circuit according to the first index and the second index of the each of the image blocks; and
adjusting the original image according to the final tone mapping curve of the each of the image blocks to obtain an enhanced image by converting brightness values of one or more pixels in the each of the image blocks according to the respective final tone mapping curve to generate one or more enhanced pixels of the enhanced image.

2. The image enhancement method according to claim 1, wherein obtaining the final tone mapping curve of the each of the image blocks comprises:
obtaining a target mapping curve set of the each of the image blocks according to the first index of the each of the image blocks and a plurality of predefined mapping curve sets; and
obtaining the final tone mapping curve of the each of the image blocks according to the second index of the each of the image blocks and the predefined tone mapping curves in the target mapping curve set.

3. The image enhancement method according to claim 1, wherein calculating the first statistical value of the brightness values of the each of the image blocks, and determining the first index according to the first statistical value comprises:
determining the first index by taking a plurality of most significant bits of the first statistical value, wherein an integer part of the first index is the most significant bits.

4. The image enhancement method according to claim 3, wherein calculating the first statistical value of the brightness values of the each of the image blocks, and determining the first index according to the first statistical value comprises:
determining the first index by taking a plurality of least significant bits of the first statistical value, wherein a decimal part of the first index is the least significant bits.

5. The image enhancement method according to claim 2, wherein obtaining the target mapping curve set of the each of the image blocks according to the first index of the each of the image blocks and the predefined mapping curve sets comprises:

in response to the first index being one of a plurality of default set indexes corresponding to the predefined mapping curve sets, selecting the target mapping curve set from the predefined mapping curve sets according to the first index; and in response to the first index not being one of the default index default set indexes corresponding to the predefined mapping curve sets, selecting two of the predefined mapping curve sets according to the first index, and generating the target mapping curve set according to the two of the predefined mapping curve sets.

6. The image enhancement method according to claim 2, wherein obtaining the final tone mapping curve of the each of the image blocks according to the second index of the each of the image blocks and the predefined tone mapping curves in the target mapping curve set comprises:

in response to the second index being one of a plurality of default curve indexes corresponding to the predefined tone mapping curves, selecting the final tone mapping curve from the predefined tone mapping curves in the target mapping curve set according to the second index; and in response to the second index not being one of the default curve indexes corresponding to the predefined tone mapping curves, selecting two of the predefined tone mapping curves in the target mapping curve set according to the second index, and generating the final tone mapping curve according to the two of the predefined tone mapping curves in the target mapping curve set.

7. The image enhancement method according to claim 1, wherein each of the predefined tone mapping curves comprises a plurality of curve segments corresponding to a plurality of slopes, the curve segments comprise a first curve segment and a second curve segment, and a first slope of the first curve segment corresponding to a lowest brightness range is smaller than a second slope of the second curve segment corresponding to another brightness range.

8. The image enhancement method according to claim 1, wherein adjusting the original image according to the final tone mapping curve of the each of the image blocks to obtain the enhanced image comprises:

converting a reference pixel in the each of the image blocks into an enhanced pixel according to the final tone mapping curve of the each of the image blocks; and performing a linear interpolation operation according to the enhanced pixel of the each of the image blocks to obtain a plurality of other enhanced pixels in the each of the image blocks, wherein the enhanced image comprises the enhanced pixel and the other enhanced pixels of the each of the image blocks.

9. An electronic device comprising:

a memory circuit; and a processing circuit coupled to the memory circuit and configured to:

divide an original image into a plurality of image blocks;

calculate a brightness variance value of a plurality of brightness values of the each of the image blocks as a first statistical value, and determine a first index according to the brightness variance value;

calculate a brightness mean value of the brightness values of the each of the image blocks as a second statistical value, and determine a second index according to the brightness mean value;

obtain a final tone mapping curve of the each of the image blocks by selecting from a plurality of predefined tone mapping curves pre-stored in the memory circuit according to the first index and the second index of the each of the image blocks; and adjust the original image according to the final tone mapping curve of the each of the image blocks to obtain an enhanced image by converting brightness values of one or more pixels in the each of the image blocks according to the respective final tone mapping curve to generate one or more enhanced pixels of the enhanced image.

10. The electronic device according to claim 9, wherein the processing circuit is configured to:

obtain a target mapping curve set of the each of the image blocks according to the first index of the each of the image blocks and a plurality of predefined mapping curve sets; and obtain the final tone mapping curve of the each of the image blocks according to the second index of the each of the image blocks and the predefined tone mapping curves in the target mapping curve set.

11. The electronic device according to claim 9, wherein the processing circuit is configured to:

determine the first index by taking a plurality of most significant bits of the first statistical value, wherein an integer part of the first index is the most significant bits.

12. The electronic device according to claim 11, wherein the processing circuit is configured to:

determine the first index by taking a plurality of least significant bits of the first statistical value, wherein a decimal part of the first index is the least significant bits.

13. The electronic device according to claim 10, wherein the processing circuit is configured to:

in response to the first index being one of a plurality of default set indexes corresponding to the predefined mapping curve sets, select the target mapping curve set from the predefined mapping curve sets according to the first index; and in response to the first index not being one of the default index default set indexes corresponding to the predefined mapping curve sets, select two of the predefined mapping curve sets according to the first index, and generating the target mapping curve set according to the two of the predefined mapping curve sets.

14. The electronic device according to claim 10, wherein the processing circuit is configured to:

in response to the second index being one of a plurality of default curve indexes corresponding to the predefined tone mapping curves, select the final tone mapping curve from the predefined tone mapping curves in the target mapping curve set according to the second index; and in response to the second index not being one of the default curve indexes corresponding to the predefined tone mapping curves, select two of the predefined tone mapping curves in the target mapping curve set according to the second index, and generating the final tone mapping curve according to the two of the predefined tone mapping curves in the target mapping curve set.

15. The electronic device according to claim 9, wherein each of the predefined tone mapping curves comprises a plurality of curve segments corresponding to a plurality of slopes, the curve segments comprise a first curve segment and a second curve segment, and a first slope of the first curve segment corresponding to a lowest brightness range is smaller than a second slope of the second curve segment corresponding to another brightness range.

16. The electronic device according to claim 9, wherein said processing circuit is configured to:

convert a reference pixel in the each of the image blocks into an enhanced pixel according to the final tone mapping curve of the each of the image blocks; and perform a linear interpolation operation according to the enhanced pixel of the each of the image blocks to obtain a plurality of other enhanced pixels in the each of the image blocks, wherein the enhanced image comprises the enhanced pixel and the other enhanced pixels of the each of the image blocks.

* * * * *